L. C. LOEWENSTEIN.
GOVERNOR.
APPLICATION FILED JUNE 29, 1910.

1,017,571.

Patented Feb. 13, 1912.

Witnesses:
Marcus L. Byng.
J. Ellis Glenn

Inventor,
Louis C. Loewenstein,
by Albert H. Davis
Att'y.

UNITED STATES PATENT OFFICE.

LOUIS C. LOEWENSTEIN, OF LYNN, MASSACHUSETTS, ASSIGNOR TO GENERAL ELECTRIC COMPANY, A CORPORATION OF NEW YORK.

GOVERNOR.

1,017,571.   Specification of Letters Patent.   Patented Feb. 13, 1912.

Application filed June 29, 1910. Serial No. 569,474.

*To all whom it may concern:*

Be it known that I, LOUIS C. LOEWENSTEIN, a citizen of the United States, residing at Lynn, county of Essex, State of Massachusetts, have invented certain new and useful Improvements in Governors, of which the following is a specification.

This invention relates to mechanism for governing the speed of prime movers such as elastic fluid turbines, steam engines, etc., and its object is to simplify the construction and produce a reliable and durable device of this character, requiring but a minimum of energy to operate it.

The invention comprises in brief, a plurality of resilient members standing normally at an oblique angle to a shaft of the prime mover and adapted to be rotated therewith so that under the influence of centrifugal force said members will tend to approach a plane of revolution and in so doing will actuate a device for controlling the supply of motive energy to the prime mover or motor.

The invention will be better understood by reference to the accompanying drawing, in which—

Figure 1:
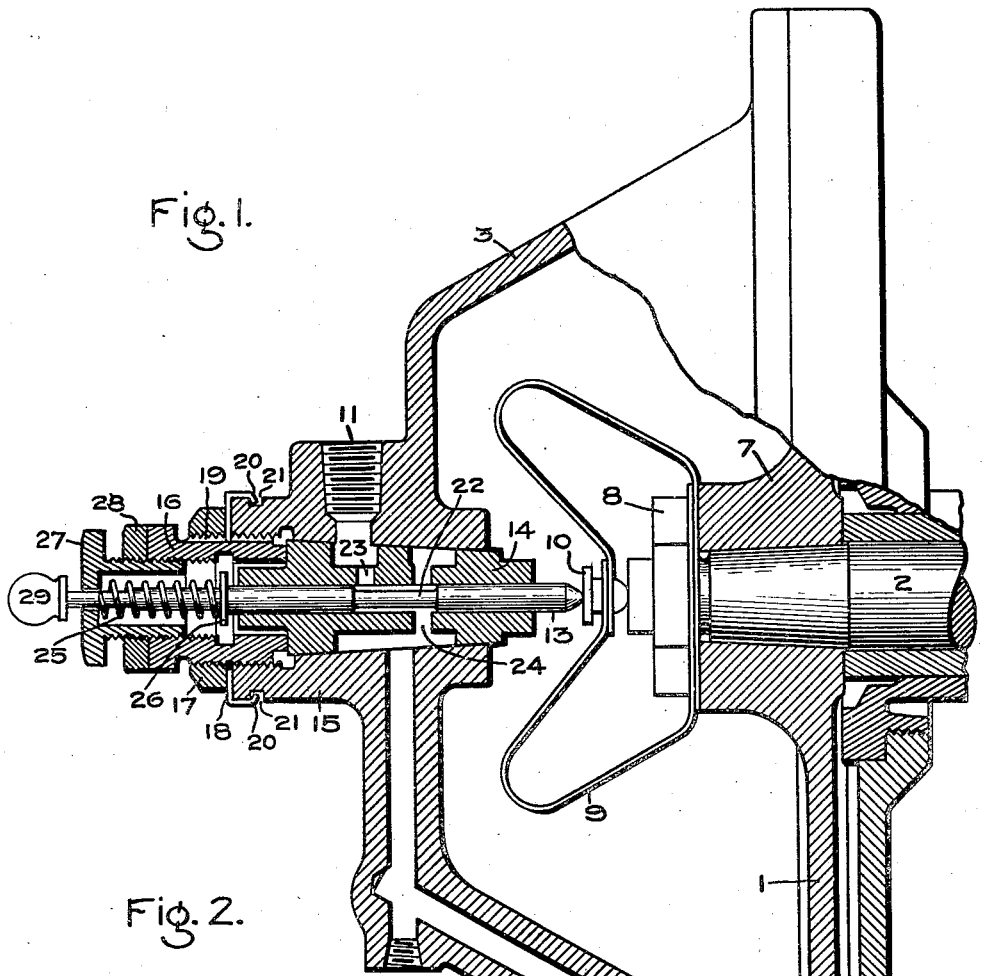
Figure 2:
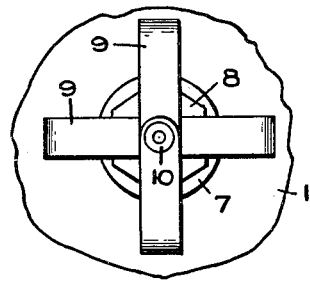

Figure 1 is a longitudinal section of a horizontal turbine equipped with my improved governor, and Fig. 2 is an end elevation of the resilient centrifugally responsive members, shown on a smaller scale than that of Fig. 1.

The invention is applicable to a variety of prime movers, but I have illustrated a horizontal turbine having a single bucket wheel 1 secured to a shaft 2 which is mounted in suitable bearings. The bucket wheel is located in a casing 3. Steam or other elastic fluid is delivered to the buckets 4 by suitable nozzles 5, or other devices, within the casing, the exhaust steam passing off through the port 6.

The end of the shaft projects beyond the hub 7 of the wheel and is screw threaded to receive a nut 8, which clamps to the face of said hub a plurality of flat resilient members 9, preferably strips of spring steel or phosphor bronze. The ends of these springs are lapped over each other across the face of the hub under the nut 8, being drilled for the passage of the end portion of the shaft. The springs radiate from the shaft at an oblique angle thereto, preferably about 45 degrees, and their free ends are bent back on an easy curve to join a reëntrant angle, terminating adjacent to the end of the shaft, where they are overlapped and secured to a beaded button 10. Each spring thus constitutes a U-shaped member radiating at an angle from the shaft, with one leg fastened to said shaft and the other attached to the corresponding leg of the opposite member. Under the action of centrifugal force each U-shaped member tends to swing out to a position at right angles to the shaft, and in so doing the free ends, attached to the button 10 will move away from the end of the shaft in an axial direction. The governor may be mounted on a shaft driven from the main shaft 2 instead of on said main shaft, as illustrated. I utilize said movement to actuate a throttle valve which controls the flow of steam from the inlet 11 to the passage 12 leading to the nozzles or other devices 5. The valve is preferably a spindle 13 bearing at its inner end against the button 10 and having a sliding fit in a bored valve body 14 mounted in a suitable casing 15 cast with the casing 3 of the turbine. The seat formed for the body 14 in the casing 15 is preferably tapered, so that said body can be forced in to make a steam-tight joint; preferably by means of a sleeve 16 screw-threaded into the casing 15 and bearing against the end of the body 14. The sleeve is provided with a lock-nut 17, and as a further precaution against its becoming loosened, a sheet metal washer 18 is slipped over it under the lock-nut, having a tongue which engages with a groove 19 in the sleeve and provided also with fingers 20 which are bent over the outside of the casing 15 into depression 21.

For a certain portion of its length the spindle is reduced in diameter at 22, and at this point in the body 14 there are ports 23, 24 leading from the inlet 11 to the bore of the body and from said bore to the passage 12. Under normal running conditions, the reduced portion of the spindle just bridges the space between these ports, so that there is a free flow of steam to the turbine. The spindle is held yieldingly in this position and against the button 10, by means of a spring 25 abutting at one end against a collar 26 on the spindle and at the other end against the inner side of a cupped nut 27 which screws into the outer end of the sleeve 16, and is provided with a lock-nut 28. The spindle projects through this nut and is provided with a handle 29 for manual operation.

When the speed of the turbine exceeds the normal, the spring members move outwardly and force the button away from the end of the shaft in an axial line, carrying with it the spindle and causing the flow of steam through the ports 23, 24, to be throttled more and more until, if the speed becomes excessive, the valve will completely shut off the steam. The device thus constitutes a sensitive and yet simple speed governor, not liable to get out of order and exposed to very little wear, which can occur only at the point of contact of the rotatable button and the non-rotating spindle, and between the spindle and the bore of the body 14.

In accordance with the provisions of the patent statutes, I have described the principle of operation of my invention, together with the apparatus which I now consider to represent the best embodiment thereof; but I desire to have it understood that the apparatus shown is illustrative only and that the invention can be carried out by other means.

What I claim as new and desire to secure by Letters Patent of the United States, is:—

1. The combination with a prime mover, of resilient members secured to a shaft thereof at an oblique angle thereto with their free ends forming a reëntrant angle and terminating adjacent to the axis of the shaft, and a throttle valve movable axially in line with said shaft and bearing against the free ends of said members.

2. The combination with a prime mover, of resilient members secured at one end to a shaft thereof and extending therefrom at an oblique angle with their free ends forming a reëntrant angle, an axially arranged button to which said free ends are secured, and a spindle bearing against said button in line with said shaft and adapted to control the supply of motive energy to said prime mover.

3. The combination with a prime mover, of springs having overlapped ends secured to the end of a shaft thereof, the free ends of said springs extending outwardly from said shaft at an oblique angle and bent back to form a reëntrant angle, an axially arranged button secured to the free overlapping ends of said springs, a valve body having ports for the flow of motive fluid through it to the prime mover, a spindle sliding in said body and controlling said ports, and a spring urging said spindle against said button.

4. The combination with a prime mover, of U-shaped centrifugally-responsive members having one leg secured to a shaft of said prime mover with their other legs forming a reëntrant angle approaching the end of said shaft and terminating adjacent to its axis, a throttle valve adapted to be directly actuated by said members, and resilient means for retaining said valve yieldingly in a normal position.

5. The combination with a motor, of a resilient, centrifugally-responsive member mounted on the end of a shaft driven by the motor, said member having a portion inclined outwardly from the axis of the shaft which is moved outwardly by centrifugal force and a second portion extending from the end of the first portion and bent inwardly to terminate adjacent the end of the shaft said second portion being moved axially by the first portion, and a device for regulating the supply of motive energy to the motor which is controlled by said second portion.

6. The combination with a prime mover, of a governing mechanism therefor comprising a rotatable shaft, a valve for controlling the supply of motive fluid to the prime mover having means for manually operating it, a spring that tends to move the valve toward its closed position, flat spring members secured at one end to an end of the shaft and projecting outwardly from the end of the shaft at an angle to the axis of rotation, then being bent backward to bring the other end to the axis of the shaft adjacent the first end, and a button carried by said second ends that is in engagement with the valve stem, said members being actuated solely by the action of the centrifugal force of their own mass to move outwardly and operate the valve.

In witness whereof, I have hereunto set my hand this 27th day of June, 1910.

LOUIS C. LOEWENSTEIN.

Witnesses:
JOHN A. MCMANUS, Jr.,
FRANK G. HATTIE.